March 7, 1967  H. HENSS ETAL  3,307,782
EDDY CURRENT TACHOMETER WITH A COUNTER FOR THE LENGTH
OF PATH DRIVEN BY THE MAGNET SHAFT BY MEANS
OF A REDUCTION GEAR
Filed Jan. 19, 1966

INVENTORS
HEINRICH HENSS
HEINZ RIETMÜLLER
BY
ATTORNEY.

3,307,782
EDDY CURRENT TACHOMETER WITH A COUNTER FOR THE LENGTH OF PATH DRIVEN BY THE MAGNET SHAFT BY MEANS OF A REDUCTION GEAR
Heinrich Henss, Oberhochstadt im Taunus, and Heinz Rietmüller, Frankfurt am Main, Germany, assignors to VDO Tachometer Werke Adolf Schindling G.m.b.H., Frankfurt am Main, Germany, a corporation of Germany
Filed Jan. 19, 1966, Ser. No. 521,587
2 Claims. (Cl. 235—95)

The present invention relates to an eddy current tachometer with a counter for the length of path driven by the magnet shaft by means of a reduction gear.

The reduction gear for the counter for the length of path in eddy current tachometers comprises as a rule two worm shafts with coordinated pinions, of which the first pinion is mounted parallel to the axis of the counter in the bearing for the magnet shaft and engages a driving worm disposed on the magnet shaft. This arrangement has different drawbacks, as for instance, the complicated mounting of this worm shaft and the additional worm thread on the magnet shaft and leads to high manufacturing costs.

It has been proposed before to connect the second worm shaft with the magnet shaft by a one-toothed drive, whereby the driving gear is secured to the magnet shaft and a Maltese-cross-shaped star gear is mounted instead of the pinion on the worm shaft. By this arrangement the drive worm is eliminated, though on the magnet shaft a first worm shaft of the reduction gear is provided however, this solution is technically not satisfactory. In addition to a comparatively large space requirement and disturbing noise development, such one-gear drives have the drawback that the appreciable friction of the pin of the driving gear in the slots of the star gear and the wear connected therewith can be countered only in such a manner, that the drive is disposed in a sealed housing and is driven in an oil bath. Such an expense is, however, not possible for the appreciable numbers of tachometers to be produced. Furthermore, the danger of a faulty counting by overrun of the star gear exists.

It is, therefore, one object of the present invention to provide an eddy current tachometer with a counter for the length of path driven by the magnet shaft by means of a reduction gear, wherein these drawbacks of the known structures are avoided.

It is another object of the present invention to provide an eddy current tachometer with a counter for the length of path driven by the magnet shaft by means of a reduction gear, wherein a flat, space-saving and reliable drive for the connection between the magnet shaft with the worm shaft driving the roller counter is provided, whereby the roller counter without special mounting slides onto the magnet shaft and the worm shaft.

It is still another object of the present invention to provide an eddy current tachometer with a counter for the length of path driven by the magnet shaft by means of a reduction gear, wherein the reduction gear is driven from an eccentric connected with the magnet shaft over a flat known eccentric switch gear of the type of swinging disk crank. The eccentric can be pressed onto the magnet shaft. In an embodiment given by example, a flat slotted swinging lever is provided which is rotatably mounted at one end on the eccentric and slides with a slot-shaped recess on a pin immovably disposed on a bearing and is retained for a swinging movement about the pin. At its free end it is formed as a driving disk having inner teeth, which driving disk engages a gear mounted on a worm shaft of the reduction gear. By use of parts of synthetic material for the switching gear, favorable friction and noise values can be obtained.

With this and other objects in view which will become apparent in the following detailed description, the present invention will be clearly understood in connection with the accompanying drawing, in which.

Figure 1:
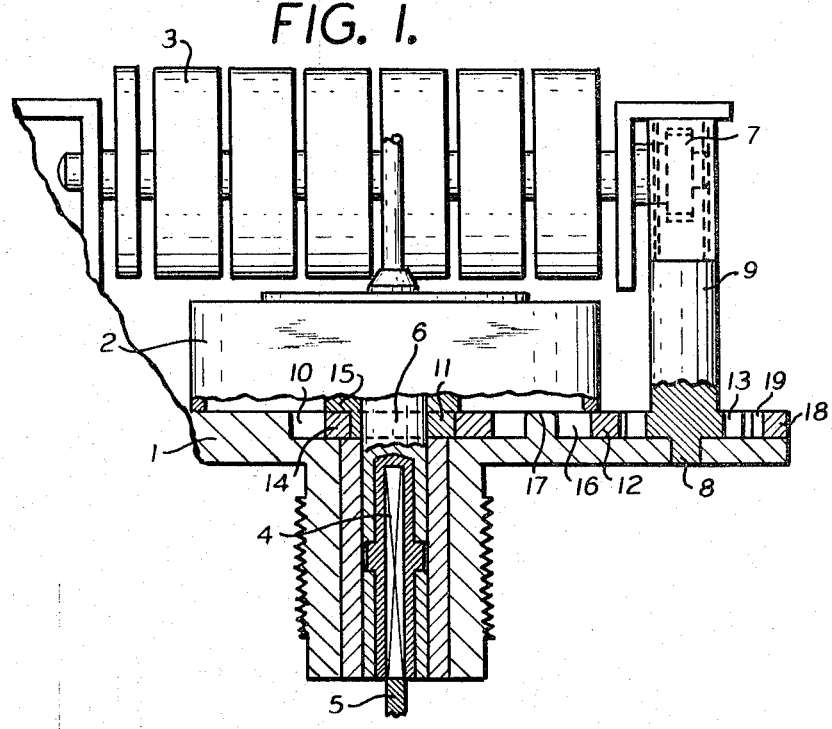
FIGURE 1 is an elevation partly in section of the reduction gear.

Referring now to the drawing, the eddy current tachometer comprises a bearing unit 1 and includes an eddy current measuring device 2 and further includes a length of path counter 3. A magnet shaft 6 which is connected by means of a square 4 with the main drive shaft 5 is mounted in the bearing unit 1. The counter 3 is driven by means of a pinion 7 from a worm shaft 9, the latter being mounted likewise in the bearing unit 1 by means of a pin 8. The bearing unit 1 has a recess 10 at the side disposed opposite the eddy current measuring device 2 and the magnet shaft 6 and the eccentric switching gear, which connects the magnet shaft 6 with the worm shaft 9, is disposed in the recess 10. The eccentric switching gear comprises an eccentric 11 pressed on the magnet shaft 6, a swinging lever 12 and a gear 13 rigidly connected with the worm shaft 9. The swinging lever 12 is rotatably mounted at one end 14 thereof on the eccentric 11 and retains its position by a collar 15 overlapping the swinging lever 12 and disposed on its upper side.

The swinging lever 12 is furthermore guided by means of a slot-shaped recess 16 cooperating with a cylindrical pin 17 secured to the bearing unit 1 and received in the slot 16.

A driving disk 18 having inner teeth and formed at the other end of the swinging lever 12 engages the gear 13 of the worm shaft 9.

Figure 2:
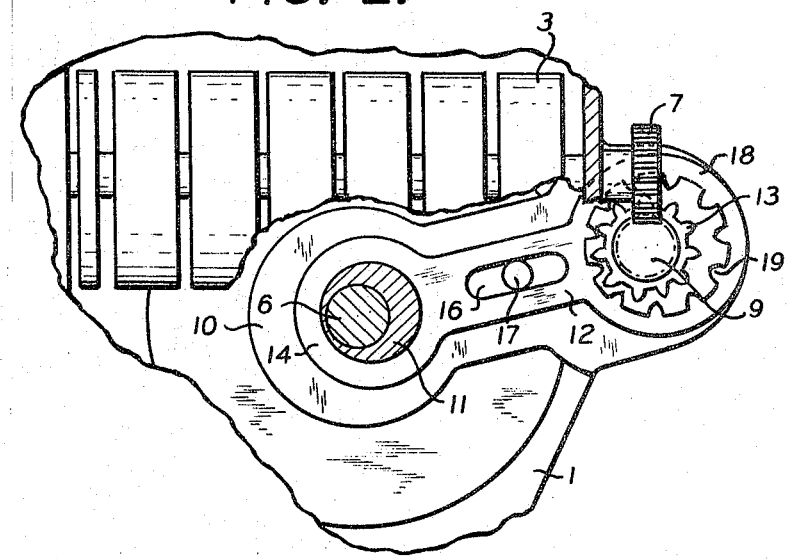
FIG. 2 is a top plan view of the eccentric switching gear.

If the magnet shaft 6 is rotated, the swinging lever 12 performs like a crank-guide, due to the operation of the eccentric 11, a movement in the longitudinal direction of the slot-shaped recess 16 and simultaneously a swinging movement about the pin 17. A driving disk 18 having inner teeth describes thereby with its axis a kidney-shaped curve about the axis of the gear 13, so that its teeth 19, each of which describes a similar curve, however, dependent upon the distance of the particular tooth from the pin 17, move ahead the gear 13 for a predetermined angle. The gear 13 is switched ahead during each complete revolution of the eccentric 11 and in particular at each completed curve-run of the teeth 19 for the difference between the number of teeth of the driving disk 18 and that of the gear 13, which is in the disclosed embodiment for one tooth. It is to be understood that in the embodiment as disclosed in FIG. 2, the driving disk 18 has eleven inner teeth and the gear 13 has ten outer teeth. By a change of the number of teeth, the reduction gear can be varied in wide ranges.

The swinging lever 12 and the gear 13 of the switching device, designed in accordance with the present invention, are flat, punched-out or extruded parts which are economical in the manufacture. By use of such space-saving reduction gear, which lends itself to manufacture in a simple manner for eddy current tachometers, which can easily slide on the drive shaft to be connected, due to the particularly possible favorable design of the bearing unit and due to the elimination of the drive worm on the magnet shaft, an appreciable material and cost saving can be brought about.

While we have disclosed one embodiment of the present invention, it is to be understood that this embodiment is given by example only and not in a limiting sense, the scope of the present invention being determined by the objects and the claims.

We claim:
1. An eddy current tachometer with a counter for the length of path driven by the magnet shaft by means of a reduction gear, comprising
a bearing unit,
a main drive shaft,
a magnet shaft rotatably mounted in said bearing unit,
means for operatively connecting said magnet shaft with said main drive shaft,
a counter operatively connected with said magnet shaft,
a worm shaft mounted in said bearing unit,
an eccentric secured to said magnet shaft,
a reduction gear means operatively connected with said eccentric,
means for driving said reduction gear means by said eccentric to perform as a swinging crank-guide,
said means for driving said reduction gear means by said eccentric comprising
a swinging lever having a longitudinal slot and rotatably mounted at one of its ends on said eccentric,
an immovable pin projecting upwardly from said bearing unit and received in and sliding relative to said longitudinal slot of said swinging lever, and said swinging lever being swingably retained by said pin and longitudinal slot on said bearing unit.

2. The eddy current tachometer, as set forth in claim 1, wherein
said swinging lever is formed at the other of its ends as a driving disk having inner teeth,
said worm shaft constituting one member of said reduction gear means and rotatably mounted in said bearing unit,
a tooth gear keyed to said worm shaft and engaging said driving disk having inner teeth, so that upon rotation of said magnet shaft and of said eccentric, said worm shaft is driven, and
means for driving said counter from said worm shaft.

References Cited by the Examiner

UNITED STATES PATENTS

| | | | |
|---|---|---|---|
| 946,253 | 1/1910 | Moore | 74—804 X |
| 1,409,196 | 3/1922 | Morton | 235—103 X |
| 2,093,068 | 9/1937 | Balk et al. | 235—95.2 |
| 2,845,821 | 8/1958 | De Noyers | 74—804 |
| 3,198,430 | 8/1965 | Hermann | 235—95 |

STEPHEN J. TOMSKY, *Primary Examiner.*